(12) United States Patent
Inda

(10) Patent No.: US 8,544,924 B2
(45) Date of Patent: Oct. 1, 2013

(54) LIFTING ASSEMBLY

(75) Inventor: Jeremy Inda, Williamsville, NY (US)

(73) Assignee: Engineered Lifting Technologies, Inc., Orchard Park, NY (US)

( * ) Notice: Subject to any disclaimer, the term of this patent is extended or adjusted under 35 U.S.C. 154(b) by 657 days.

(21) Appl. No.: 12/614,351

(22) Filed: Nov. 6, 2009

(65) Prior Publication Data

US 2011/0109106 A1 May 12, 2011

(51) Int. Cl.
*B66F 19/00* (2006.01)

(52) U.S. Cl.
USPC .......................................................... 294/215

(58) Field of Classification Search
USPC .................. 294/86.4, 68.1, 68.3, 67.1, 67.2, 294/67.3, 67.22, 67.44, 75, 82.1, 81.1, 81.5, 294/81.6, 82.24, 81.3, 81.56, 82.13, 89, 215; 403/78–79, 164; 410/101; 411/539, 398, 411/178

See application file for complete search history.

(56) References Cited

U.S. PATENT DOCUMENTS

| | | | |
|---|---|---|---|
| 859,513 A * | 7/1907 | Paige | 254/93 R |
| 1,097,185 A | 5/1914 | Oeherle | |
| 1,727,685 A * | 9/1929 | Willoughby | 220/1.5 |
| 3,006,443 A | 10/1961 | Siler | |
| 3,686,877 A | 8/1972 | Boden | |
| 4,621,962 A * | 11/1986 | Rozniecki | 411/368 |
| 5,141,357 A | 8/1992 | Sherman | |
| 5,207,468 A | 5/1993 | Saulnier et al. | |
| 5,653,556 A | 8/1997 | White | |
| 5,707,168 A * | 1/1998 | Sharon | 403/362 |
| 7,281,902 B2 | 10/2007 | Mortensen | |
| 7,883,131 B2 * | 2/2011 | Camp et al. | 294/82.23 |
| 2004/0091346 A1 | 5/2004 | Wobben | |
| 2006/0055188 A1 | 3/2006 | Koch | |
| 2009/0107062 A1 | 4/2009 | Pedersen | |

FOREIGN PATENT DOCUMENTS

| | | | |
|---|---|---|---|
| EP | 1302447 | * | 4/2003 |
| WO | WO 02/04321 | * | 7/2001 |
| WO | 2008000262 A1 | | 3/2008 |
| WO | WO 2008000262 | * | 3/2008 |

* cited by examiner

*Primary Examiner* — Stephen Vu
(74) *Attorney, Agent, or Firm* — The Bilicki Law Firm, P.C.; Rebecca Tapscott; Byron Bilicki

(57) ABSTRACT

A lifting bracket for a lifting assembly to lift a cylindrical object having an annular flange with a plurality of spaced-apart holes formed therein using a lifting device is provided. The bracket includes a flange attachment piece having at least one adjustable hole assembly for aligning with at least one hole of said plurality of spaced-apart holes on the flange such that the bracket may be used to lift objects having spaced-apart holes of varying distances. The bracket also includes a hoist ring for receiving a wire rope and a swivel device having a hoist ring connection loop. The swivel device freely rotates about a pin and the hoist ring freely pivots when the object is being lifted from a horizontal position to a vertical position.

9 Claims, 15 Drawing Sheets

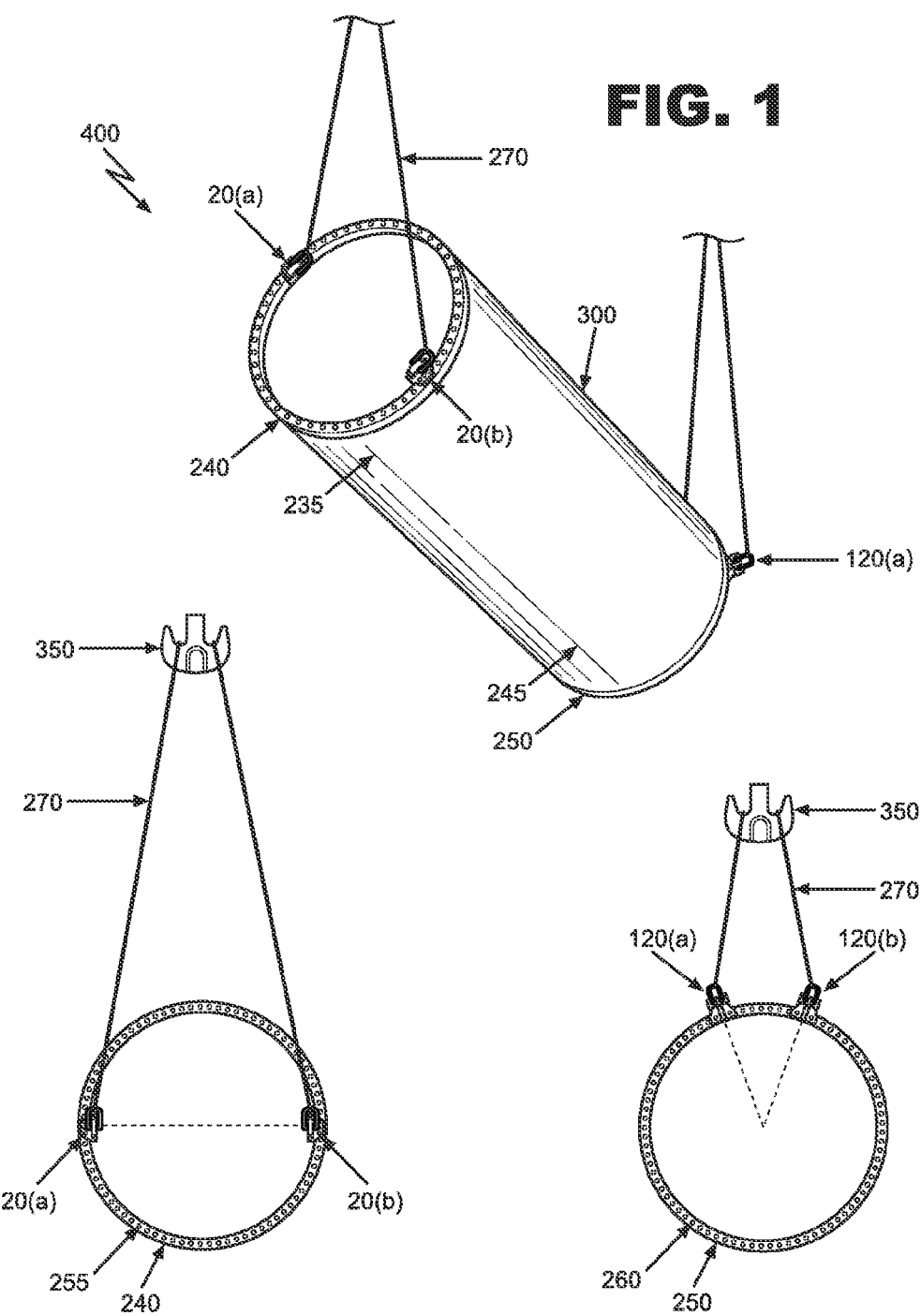

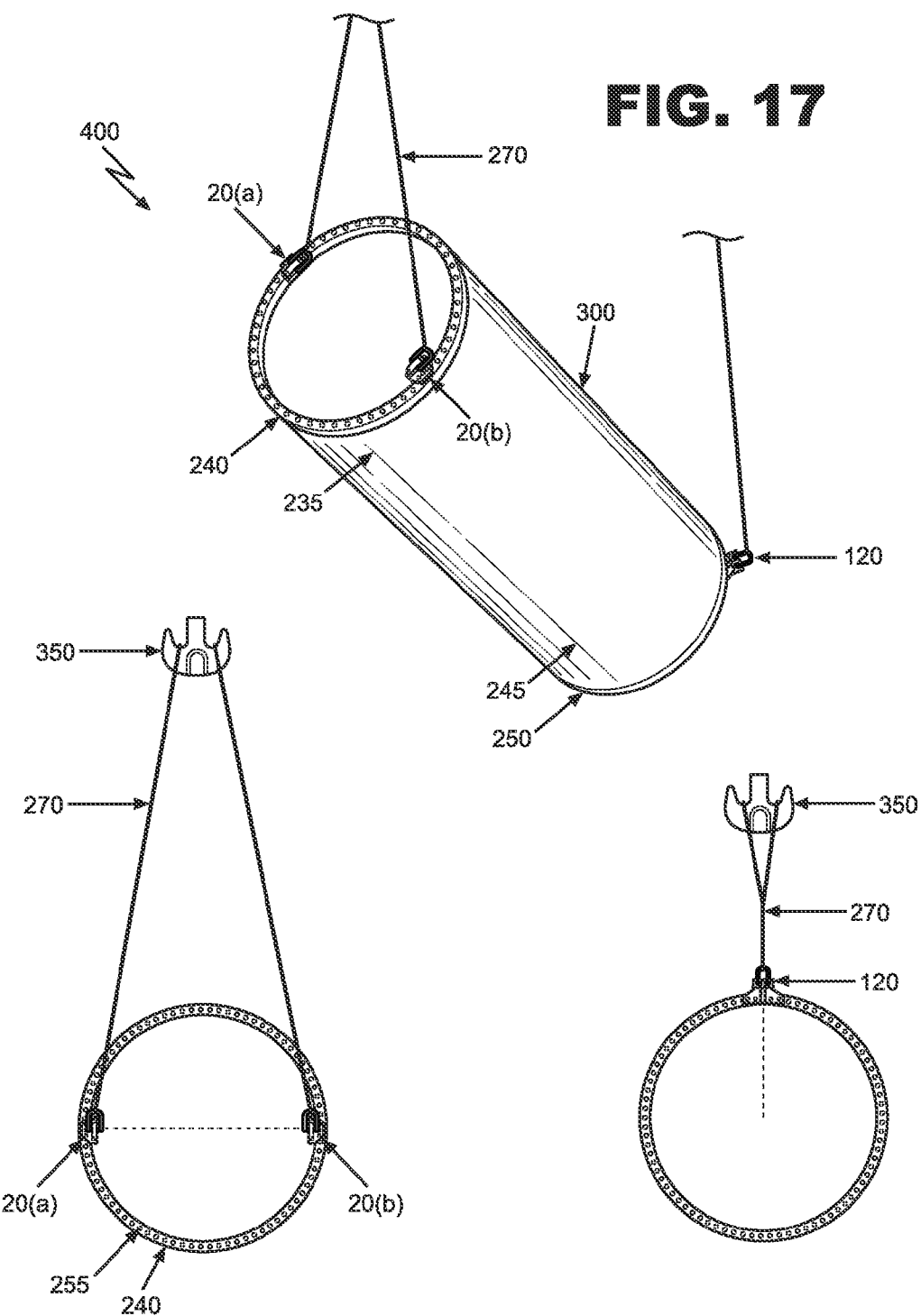

US 8,544,924 B2

LIFTING ASSEMBLY

BRIEF DESCRIPTION OF DRAWINGS

FIG. 1 illustrates a perspective view of the lifting assembly in accordance with a first embodiment.

FIG. 2 illustrates a front view of the upper flange of the object with upper lifting brackets in accordance with the first embodiment.

FIG. 3 illustrates a front view of the lower flange of the object with lower lifting brackets in accordance with the first embodiment.

FIG. 17 illustrates a top perspective view of the lifting assembly in accordance with the fourth embodiment.

FIG. 18 illustrates a front view of the upper flange of the object with upper lifting brackets in accordance with the fourth embodiment.

FIG. 19 illustrates a front view of the lower flange of the object with lower lifting bracket in accordance with the fourth embodiment.

DETAILED DESCRIPTION

Figure 4:
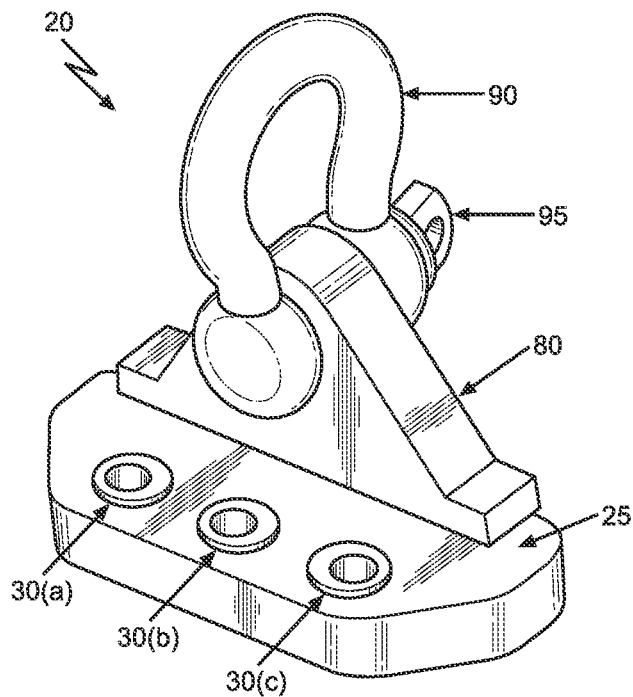
FIG. 4 illustrates a top perspective view of the upper lifting bracket in accordance with the first embodiment.

Each embodiment is directed to an apparatus and method for a lifting assembly which is used to lift objects using a lifting device. The object is lifted by the lifting assembly, which employs lifting brackets. The lifting brackets are adjustable such that they can be adapted to lift a number of different objects having different bolt patterns. Normally, the objects to be lifted incorporate different assemblies which have different bolt patterns. This adjustability of the bracket is obtained by incorporating at least one cam into one or more of the upper lifting bracket and the lower lifting bracket.

Reference will now be made in detail to the embodiments of the invention, examples of which are illustrated in the drawings. The lifting assembly includes an upper lifting bracket and a lower lifting bracket. According to the first embodiment as illustrated in FIGS. 1-3, a lifting assembly 400 includes a first upper lifting bracket 20(a), a second upper lifting bracket 20(b), a first lower lifting bracket 120(a) and a second lower lifting bracket 120(b) (seen in FIG. 3). These brackets are used to lift an object 300 by a lifting device 350 (seen in FIG. 2). The object 300 to be lifted may be long and heavy such as a windmill tower, smoke stack, silo and the like. The lifting device 350 may be a crane, a hoist, a block and tackle or the like, which is used to lift heavy objects. The object 300 has an upper end 235 having an upper flange 240 and a lower end 245 having a lower flange 250. As shown in FIG. 2 and FIG. 3, the upper flange 240 has spaced apart holes 255 and the lower flange 250 has spaced apart holes 260, respectively.

Figure 5:
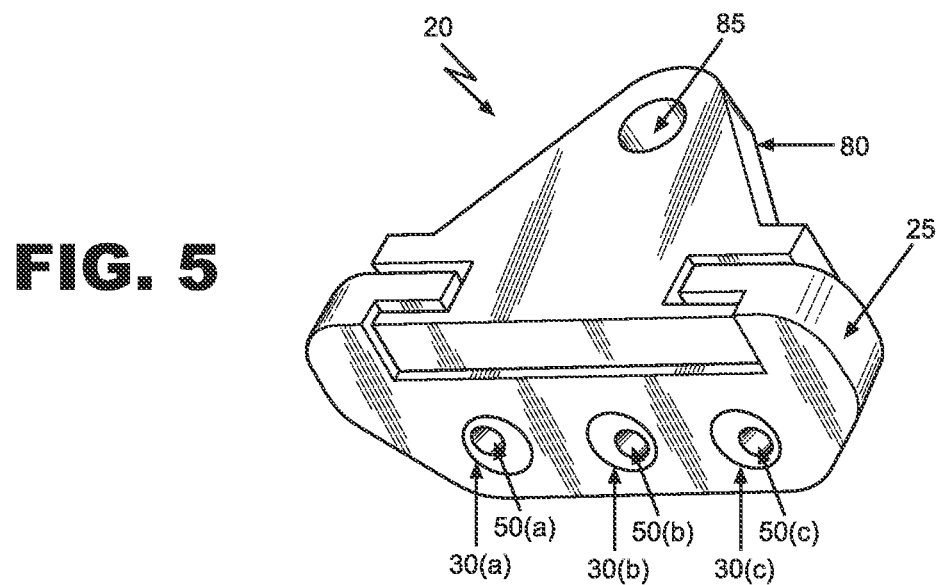
FIG. 5 illustrates a back perspective view of the upper lifting bracket in accordance with the first embodiment.
Figure 6:
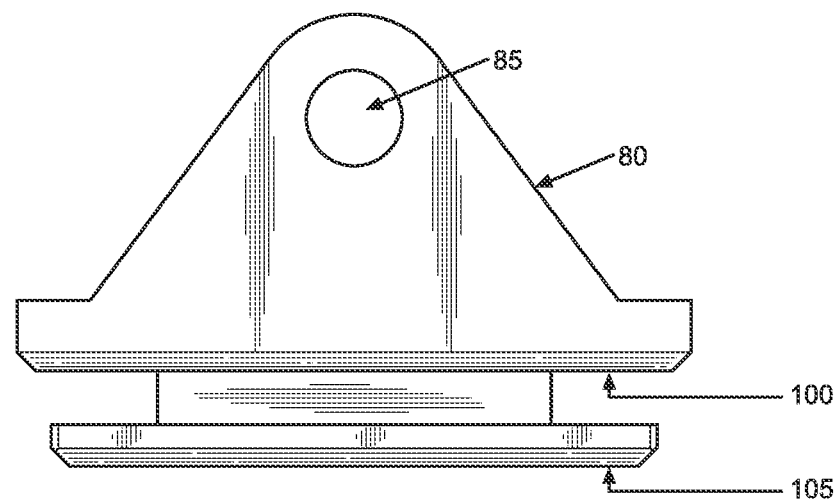
FIG. 6 illustrates a front view of the upright piece of the upper lifting bracket in accordance with the first embodiment.
Figure 7:
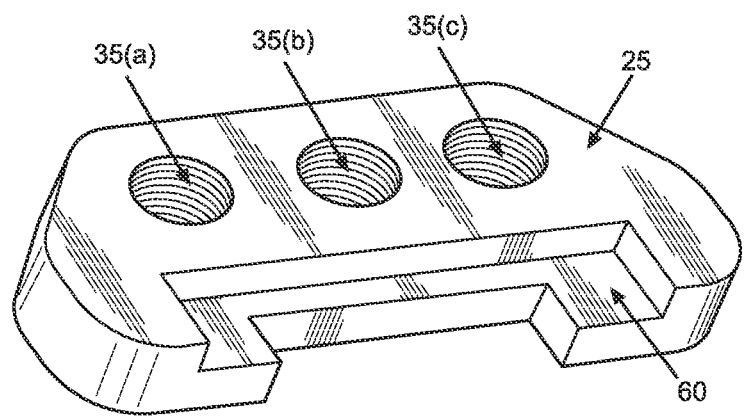
FIG. 7 illustrates a perspective view of the flange attachment piece of the upper lifting bracket in accordance with the first embodiment.

FIG. 4 illustrates an upper lifting bracket 20, representing the first upper lifting bracket 20(a) and the second upper lifting bracket 20(b). The upper lifting bracket 20 comprises of a flange attachment piece 25, an upright piece 80 and a loop 90. The flange attachment piece 25 has adjustable hole assemblies, a first adjustable hole assembly 30(a), a second adjustable hole assembly 30(b) and a third adjustable hole assembly 30(c). As illustrated in FIG. 5, the upright piece 80 has an opening 85 which engages the loop 90. The loop 90 is aligned with the opening 85 of the upright piece 80 and removably attached to it by means of a fastener 95 (seen in FIG. 4). A rivet or any other similar means may be used for the attachment. The upper lifting bracket 20 may be made of any material having high tensile strength such as steel or the like. As illustrated in FIG. 6, the upright piece 80 has a cut out section 100 and a bottom engagement part 105. As illustrated in FIG. 7, the flange attachment piece 25 of the upper lifting bracket 20 has a cutout recess on its upper surface which forms an engagement section 60. The upright piece 80 is positioned along the engagement section 60 of the flange attachment piece 25 such that the cut out section 100 fits snugly into the recess of the engagement section 60. Upright piece 80 and flange attachment piece 25 are machined such that they fit together to form the L-shaped upper lifting bracket 20. As shown in FIGS. 1-2, upper lifting bracket 20 is attached to upper flange 240 such that upright piece 80 is closest to an inner perimeter of said flange.

Figure 8:
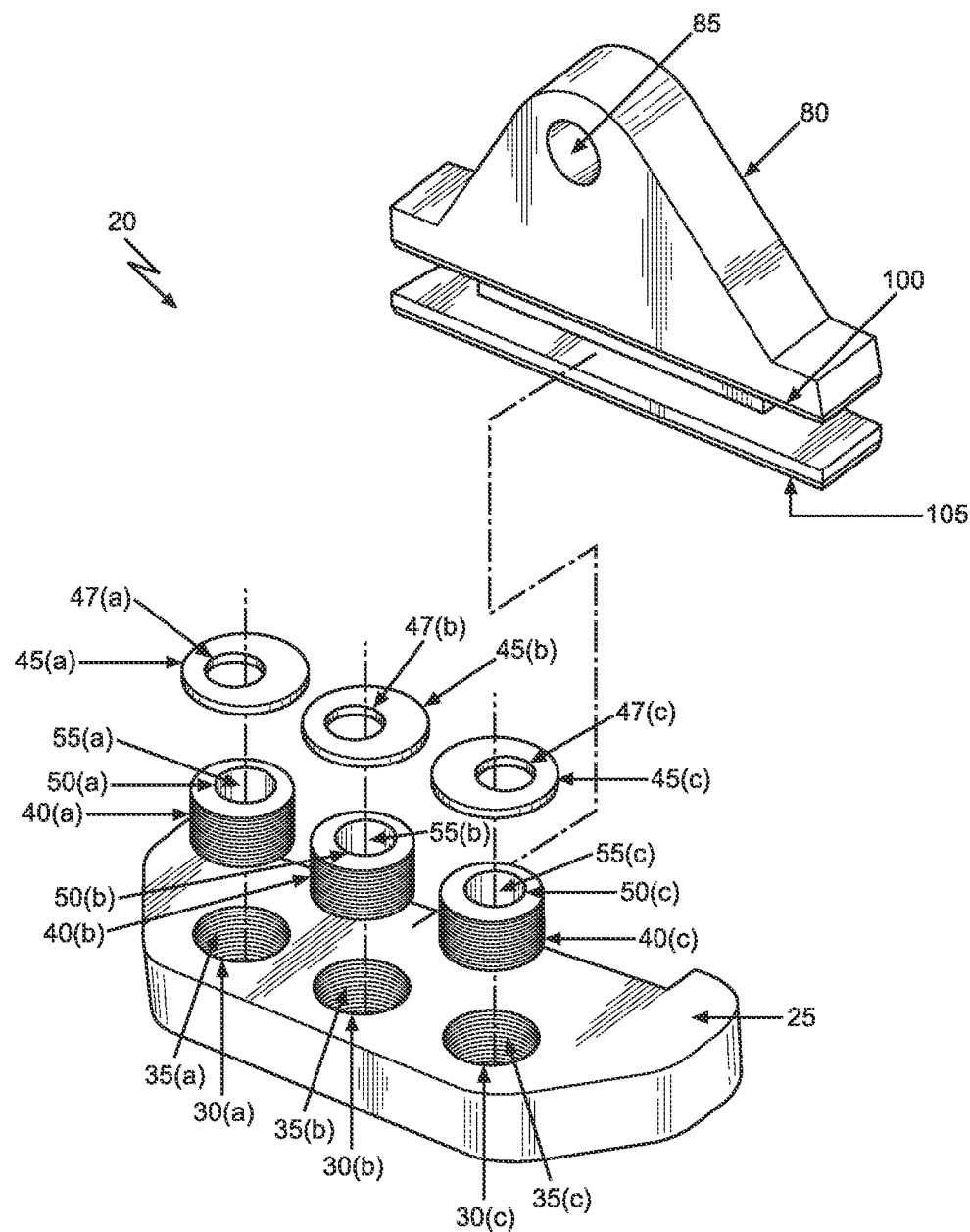
FIG. 8 illustrates an exploded view of the upper lifting bracket in accordance with the first embodiment.

FIG. 8 illustrates the exploded view of the upper lifting bracket 20. Lifting bracket 20 includes a first adjustable hole assembly 30(a) including a through hole 35(a) with a threaded cylindrical wall, which engages a threaded insert 40(a). An annular flange 45(a) with a concentric hole 47(a) is fixedly secured atop the threaded insert 40(a). Annular flange 45(a) has a diameter larger than the diameter of the first through hole 35(a), such that a portion of the outer perimeter of the bottom surface of the annular flange 45(a) rests atop the bracket 20, when the threaded insert 40(a) is fully positioned within the first through hole 35(a). Within the threaded insert 40(a) is an eccentric hole 50 (a) that does not share a common center point with the first through hole 35(a). The diameter of the eccentric hole 50(a) is appreciably less than the diameter of the first through hole 35(a) such that the eccentric hole 50(a) bores through the length of the threaded insert 40(a), thereby forming an additional through hole 55(a). When annular flange 45(a) and threaded insert 40(a) are positioned within first through hole 35(a), the concentric hole 47(a) and eccentric hole 50(a) are aligned such that a bolt or the like can be fastened with through hole 35(a).

Similarly, bracket 20 includes second adjustable hole assembly 30(b) including second through hole 35(b) having a threaded cylindrical wall, which engages a threaded insert 40(b). An annular flange 45(b) with a concentric hole 47(b) is fixedly secured atop the threaded insert 40(b) and has a diameter larger than the diameter of the first through hole 35(b), such that a portion of the outer perimeter of the bottom surface of the annular flange 45(b) rests atop the bracket 20, when the threaded insert 40(b) is fully positioned within the second through hole 35(b). Within second insert 40(b) is an eccentric hole 50(b) that does not share a common center point with the second through hole 35(b). The diameter of the eccentric hole 50(b) is appreciably less than the diameter of the second through hole 35(b) such that the eccentric hole 50(b) bores through the length of the threaded insert 40(b), thereby forming an additional through hole 55(b). When annular flange 45(b) and threaded insert 40(b) are positioned within through hole 35(b), the concentric hole 47(b) and eccentric hole 50(b) are aligned such that a bolt or the like can be fastened with through hole 35(b).

Likewise, third adjustable hole assembly 30(c) includes a first through hole 35(c) having a threaded cylindrical wall, which engages a threaded insert 40(c). An annular flange 45(c) with a concentric hole 47(c) is fixedly secured atop the threaded insert 40(c) and has a diameter larger than the diameter of the first through hole 35(c), such that a portion of the outer perimeter of the bottom surface of the annular flange 45(c) rests atop the bracket 20, when the threaded insert 40(c) is fully secured within the third through hole 35(c). Within the threaded insert 40(c) is an eccentric hole 50(c) that does not share a common center point with the third through hole 35(c). The diameter of the eccentric hole 50(c) is appreciably less than the diameter of the third through hole 35(c) such that the eccentric hole 50(c) bores through the length of the threaded insert 40(c), thereby forming an additional through hole 55(c). When annular flange 45(a) and threaded insert 40(a) are positioned within first through hole 35(a), the concentric hole 47(a) and eccentric hole 50(a) are aligned such that a bolt or the like can be fastened with through hole 35(a).

The first adjustable hole assembly 30(a) may be adjusted by grasping annular flange 45(a) and hand-turning it such that threaded insert 40(a) is rotated in either clockwise or counter-clockwise direction. Thus, the eccentric hole 50(a) changes position within the first through hole 35(a), the center point of which becoming closer to or further from the center point of the eccentric hole 50(b) of the adjacent second adjustable hole assembly 30(b), depending on its initial position. By actuating the first adjustable hole assembly 30(a), the distance between the first adjustable hole assembly 30(a) and the second adjustable hole assembly 30(b) can be varied as much as ⅜ inches with the use of threaded insert 40(a).

Similarly, the second adjustable hole assembly 30(b) can be hand-turned in either clockwise or counter-clockwise direction by grasping the annular flange 45(b) and hand-turning it. As second adjustable hole assembly 30(b) is turned the distance is varied between the center point of the eccentric hole 50(b) of the second adjustable hole assembly 30(b) and the of the center point of the eccentric hole of the adjacent adjustable hole assemblies on its either side, 30(a) and 30(c). Thus, by actuating the second adjustable hole assembly 30(b), the distance between the second adjustable hole assembly 30(b) and the adjacent adjustable hole assemblies, 30(a) and 30(c), can be varied as much as ⅜ inches with the use of threaded insert 40(b).

Likewise, the third adjustable hole assembly 30(c) can be hand-turned in either clockwise or counter-clockwise direction by grasping the annular flange 45(c) and hand-turning it, in order to vary the distance between the center point of the eccentric hole 50(c) of the third adjustable hole assembly 30(c) and the of the center point of the eccentric hole 50(b) of the second adjustable hole assembly 30(b). Thus, by actuating the third adjustable hole assembly 30(c), the distance between the eccentric hole 50(c) of the third adjustable hole assembly 30(c) and the eccentric hole 50(b) of the second adjustable hole assembly 30(b) can be varied as much as ⅜ inches with the use of threaded insert 40(c). This provides adaptability to the upper lifting bracket 20 so that it can be used to lift different object assemblies with different bolt patterns.

Figure 9:
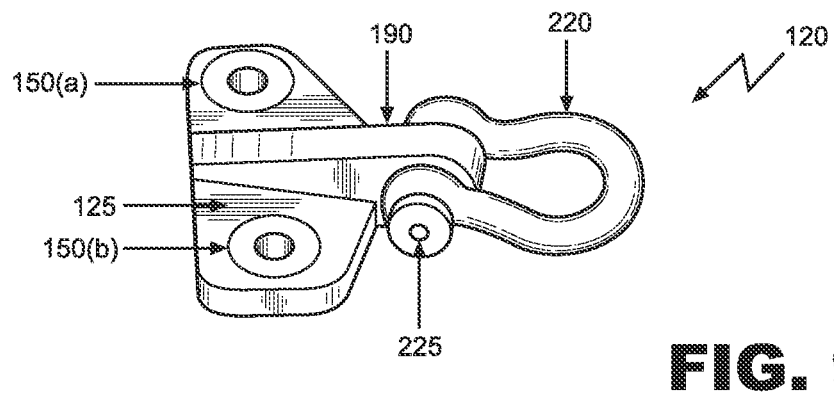
FIG. 9 illustrates a top perspective view of the lower lifting bracket in accordance with the first embodiment.
Figure 10:
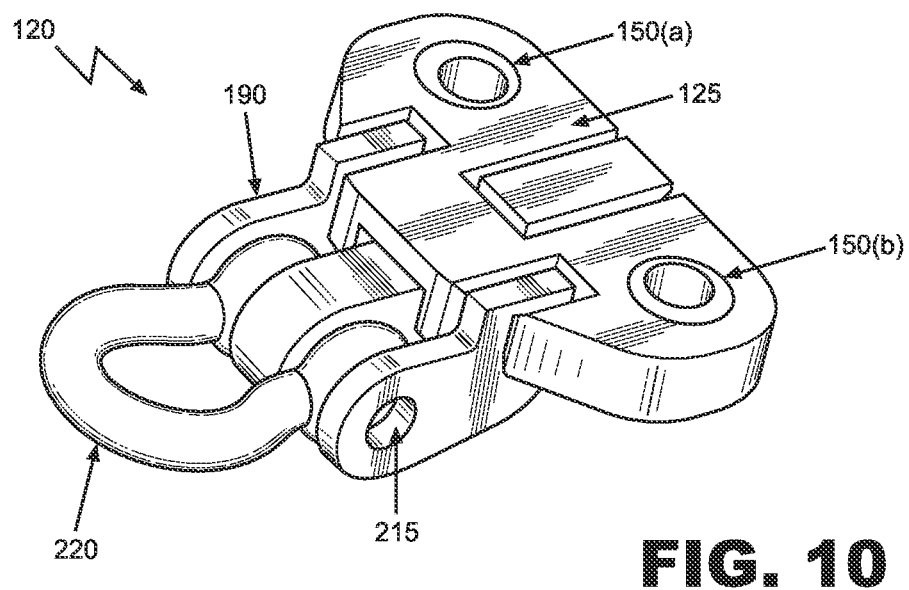
FIG. 10 illustrates a bottom perspective view of the lower lifting bracket in accordance with the first embodiment.
Figure 11:
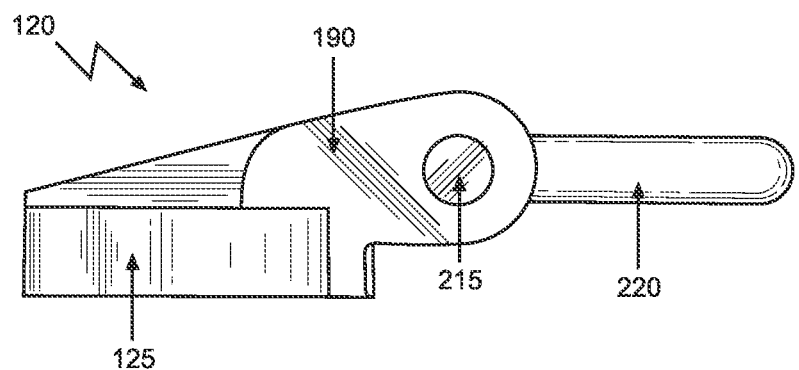
FIG. 11 illustrates a side view of the lower lifting bracket in accordance with the first embodiment.
Figure 12:
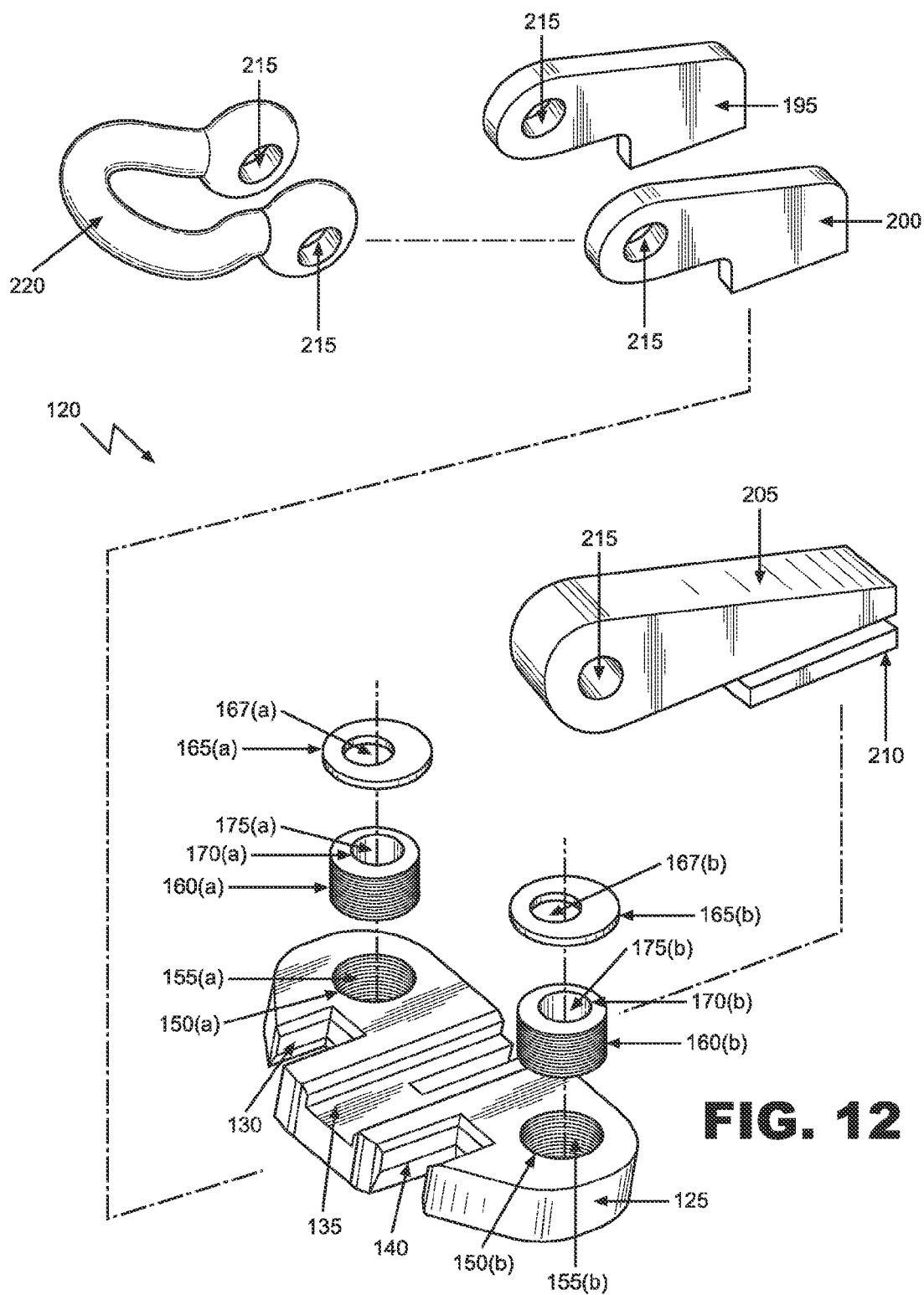
FIG. 12 illustrates an exploded view of the lower lifting bracket in accordance with the first embodiment.

FIG. 9 illustrates a lower lifting bracket 120, representing the first lower lifting bracket 120(a) and the second lower lifting bracket 120(b). The lower lifting bracket 120 comprises of a first portion 125, a second portion 190 and a loop 220. The first portion 125 has a first adjustable hole assembly 150(a) on one side of the second portion 190 and a second adjustable hole assembly 150(b) on the other side of the second portion 190. As illustrated in FIG. 10 and FIG. 11, the second portion 190 is attached to the first portion 125 and adapted to engage the loop 220. The lower lifting bracket 120 may be made of any material having high tensile strength such as steel or the like. As illustrated in the exploded view of the lower lifting bracket 120 in FIG. 12, the first portion 125 has a first recess which forms a first outer mating area 130, a second recess which forms a second outer mating area 140 and a center mating surface 135. The second portion 190 has a first outer piece 195, a second outer piece 200, a center piece 205 and a bottom engagement part 210. The first outer piece 195, the second outer piece 200 and the center piece 205 each have an opening 215 formed within. The loop 220 also has similar openings 215 formed within. The first outer piece 195 is fit within the recess of the first outer mating area 130, the second outer piece 200 is fit within the recess of the second outer mating area 140, the center piece 205 is fit over the center mating surface 135 and the loop 220 is fit around the center piece 205 and in between the first outer piece 195 and the second outer piece 200 such that all the openings 215 are aligned along a common central axis. These are all then removably secured by means of a fastener 225 (seen in FIG. 9). A rivet or any other similar means may be used for the attachment.

The first adjustable hole assembly 150(a) has a threaded cylindrical wall forming a first through hole 155(a), which engages a threaded insert 160(a). An annular flange 165(a) with a concentric hole 167(a) is fixedly secured atop the threaded insert 160(a) and has a diameter larger than the diameter of the first through hole 155(a), such that a portion of the outer perimeter of the bottom surface of the annular flange 165(a) rests atop the bracket 120, when the threaded insert 160(a) is fully secured within the through hole 155(a). Within threaded insert 160(a) is an eccentric hole 170(a) that does not share a common center point with the first through hole 155(a). The diameter of the eccentric hole 170(a) is appreciably less than the diameter of the first through hole 155(a) such that the eccentric hole 170(a) bores through the length of the threaded insert 160(a), thereby forming an additional through hole 175(a).

Similarly, the second adjustable hole assembly 150(b) has a threaded cylindrical wall forming a first through hole 155(b), which engages a threaded insert 160(b). An annular flange 165(b) with a concentric hole 167(b) is fixedly secured atop the threaded insert 160(b) and has a diameter larger than the diameter of the first through hole 155(*b*), such that a portion of the outer perimeter of the bottom surface of the annular flange 165(*b*) rests atop the bracket 120, when the threaded insert 160(*b*) is fully secured within the second through hole 155(*b*). Within the annular flange 165(*b*) is an eccentric hole 170(*b*) that does not share a common center point with the second through hole 155(*b*). The diameter of the eccentric hole 170(*b*) is appreciably less than the diameter of the second through hole 155(*b*) such that the eccentric hole 170(*b*) bores through the length of the threaded insert 160(*b*), thereby forming an additional through hole 175(*b*).

The first adjustable hole assembly 160(*a*) may be adjusted by grasping the annular flange 165(*a*) and hand-turning it in either clockwise or anti clockwise direction such that the threaded insert 160(*a*) rotates and the eccentric hole 170(*a*) changes position within the first through hole 155(*a*). As the first adjustable hole assembly 150(*a*) is turned the center point of eccentric hole 170(*a*) becomes closer to or further from the center point of the eccentric hole 170(*b*) of the second adjustable hole assembly 150(*b*), depending on its initial position. Thus, by actuating the first adjustable hole assembly 150(*a*), the distance between the first adjustable hole assembly 150(*a*) and the second adjustable hole assembly 150(*b*) can be varied as much as ⅜ inches with the use of threaded insert 160(*a*).

Similarly, the second adjustable hole assembly 150(*b*) can be hand-turned in either clockwise or anti-clockwise direction by grasping the annular flange 165(*b*) and rotating it. Thus, the distance is varied between the center point of the eccentric hole 170(*b*) of the second cam 150(*b*) and the center point of the eccentric hole 170(*a*) of the first cam 150(*a*). By actuating the second cam 150(*b*), the distance between the second cam 150(*b*) and the first cam 150(*a*) can be varied as much as ⅜ inches with the use of threaded insert 160(*b*). This provides adaptability to the lower lifting bracket 120 so that it can be used to lift different object assemblies with different bolt patterns.

As seen in FIG. 2, the first upper lifting bracket 20(*a*) and the second upper lifting bracket 20(*b*) are positioned along the upper flange 240 of the object 300 at nine o' clock and three o' clock position, respectively. The first adjustable hole assembly 30(*a*) of the first upper lifting bracket 20(*a*) is aligned with respect to the spaced apart holes 255 along the upper flange 240 by hand turning it and hence adjusting the distance, such that a fastening bolt or the like, passing through the eccentric hole 50(*a*) of the first adjustable hole assembly 30(*a*) also passes through one of spaced apart holes 255 along the upper flange 240 of the object 300.

Similarly, the second adjustable hole assembly 30(*b*) of the first upper lifting bracket 20(*a*) is aligned with respect to the spaced apart holes 255 along the upper flange 240 by hand turning it and hence adjusting the distance, such that a fastening bolt or the like, passing through the eccentric hole 50(*b*) of the second adjustable hole assembly 30(*b*) also passes through the spaced apart holes 255 along the upper flange 240 of the object 300.

Likewise, the third adjustable hole assembly 30(*c*) of the first upper lifting bracket 20(*a*) is aligned with respect to the spaced apart holes 255 along the upper flange 240 by hand turning it and hence adjusting the distance, such that a fastening bolt or the like, passing through the eccentric hole 50(*c*) of the third adjustable hole assembly 30(*c*) also passes through the spaced apart holes 255 along the upper flange 240 of the object 300. A nut may be used in order to secure the fastening bolts. Thus, the first upper lifting bracket 20(*a*) is securely fastened along the upper flange 240 at the upper end 135 of the object 300 at the nine o' clock position. The second upper lifting bracket 20(*b*) is similarly aligned and fastened along the upper flange 240 of the object 300 at the three o' clock position.

As illustrated in FIG. 3, a first lower lifting bracket 120(*a*) and a second lower lifting bracket 120(*b*) are positioned along the lower flange 250 at the lower end 245 of the object 300 at eleven o' clock and one o' clock position, respectively. The first adjustable hole assembly 150(*a*) of the first lower lifting bracket 60(*a*) is aligned with respect to the spaced apart holes 260 along the lower flange 250 by hand turning it and hence adjusting the distance, such that a fastening bolt or the like, passing through the eccentric hole 170(*a*) of the first adjustable hole assembly 150(*a*) also passes through one of the spaced apart holes 260 along the lower flange 250 of the object 300.

Similarly, the second adjustable hole assembly 150(*b*) of the first lower lifting bracket 120(*a*) is aligned with respect to the spaced apart holes 260 along the lower flange 250 by hand turning it and hence adjusting the distance, such that a fastening bolt or the like, passing through the eccentric hole 170(*b*) of the second adjustable hole assembly 150(*b*) also passes through one of the spaced apart holes 260 along the lower flange 250 of the object 300. A nut may be used in order to secure the fastening bolts. Thus, the first lower lifting bracket is securely fastened along the lower flange 250 at the lower end 245 of the object 300 at the eleven o' clock position. The second lower lifting bracket 120(*b*) is similarly aligned and fastened along the lower flange 250 of the object 300 at the one o' clock position.

Once the pair of upper lifting brackets 20(*a*) and 20(*b*) and the pair of lower lifting brackets 120(*a*) and 120(*b*) are aligned and fastened along their positions on the upper flange 240 and lower flange 260 of the object 300 respectively, a cable 270 is used to hook the lifting device 350 to the loops 90 and 220 of the upper lifting brackets 20(*a*) and 20(*b*) and the lower lifting brackets 120(*a*) and 120(*b*), respectively. A chain, rope or any other similar means may be used to hook the lifting device 350 to the loops 90 and 220. The lifting device 350 then first raises the object 300 while it is positioned horizontally relative to ground and then lowers the lower end 245 of the object 300 such that the object 300 comes into a vertical position relative to ground.

Figure 13:
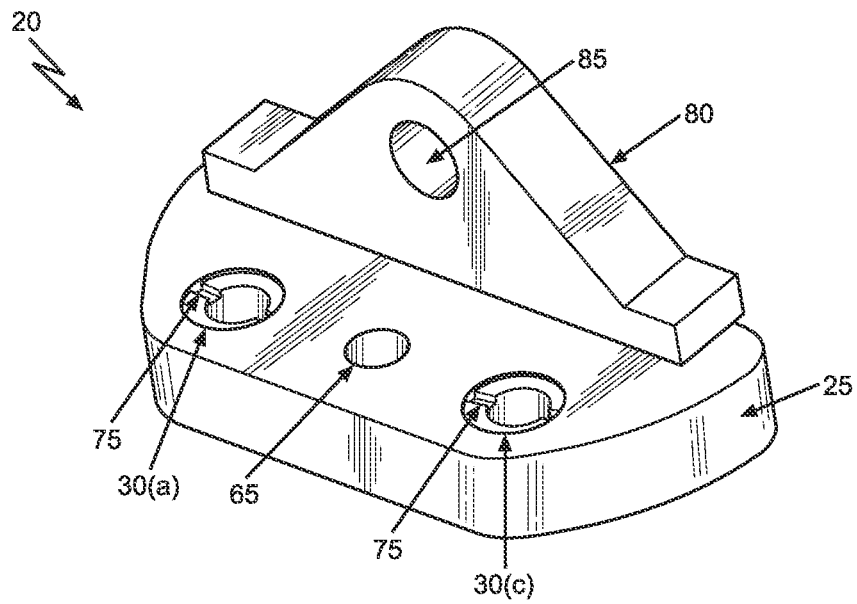
FIG. 13 illustrates a top perspective view of the upper lifting bracket in accordance with a second embodiment.

A second embodiment with respect to the upper lifting bracket 20 is illustrated in FIG. 13. According to the embodiment, the upper lifting bracket 20 comprises of a flange attachment piece 25 and an upright piece 80. The upper lifting bracket of the present embodiment is similar to that of the first embodiment described above; however, in the second embodiment the second adjustable hole assembly 30(*b*) of the upper lifting bracket 20 of the first embodiment is replaced by a guide pin hole 65, such that the first adjustable hole assembly 30(*a*) and the third adjustable hole assembly 30(*c*) lie on either side of the guide pin hole 65. The guide pin hole 65 is a simple through hole, unlike the through hole of the adjustable hole assembly with the threaded insert. The guide pin hole 65 may serve as another point of attachment of the lifting bracket to the mounting assembly. It may also be used as a measurement reference in order to vary the distance between the first adjustable hole assembly 30(*a*) and the third adjustable hole assembly 30(*c*) of the upper lifting bracket 20. A notch 75 may be formed on the threaded insert 40(*a*) and the threaded insert 40(*c*) of the first adjustable hole assembly 30(*a*) and the third adjustable hole assembly 30(*c*), respectively, in order to facilitate turning of the inserts with a tool or the like.

Figure 14:
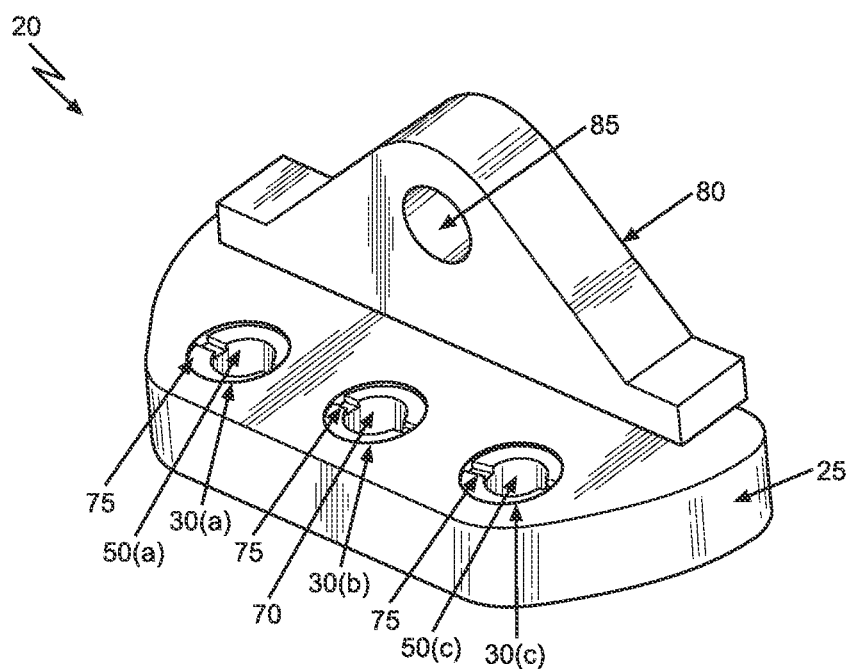
FIG. 14 illustrates a top perspective view of the upper lifting bracket in accordance with a third embodiment.

A third embodiment with respect to the upper lifting bracket 20 is illustrated in FIG. 14. According to the embodiment, the upper lifting bracket 20 comprises of a flange attachment piece 25 and an upright piece 80. The upper lifting bracket of the present embodiment is similar to that of the first embodiment of the invention described; however, the eccentric hole 50(b) within the threaded insert 40(b) of second adjustable hole assembly 30(b) of the upper lifting bracket 20 of the first embodiment is replaced by a concentric hole 70 within the threaded insert 40(b) of second adjustable hole assembly 30(b). The hole 70 forms a concentric hole as it shares a common center point with the first through hole 35(b) of the second adjustable hole assembly 30(b). The diameter of the concentric hole 70 is appreciably less than the diameter of the first through hole 35(b) of the second adjustable hole assembly 30(b) such that the concentric hole 70 bores through the length of the threaded insert 40(b), of the second adjustable hole assembly 30(b) thereby forming an additional through hole 55(b). A notch 75 may be formed on the threaded insert 40(a), the threaded insert 40(b) and the threaded insert 40(c) in order to facilitate turning of the inserts with a tool or the like.

Figure 15:
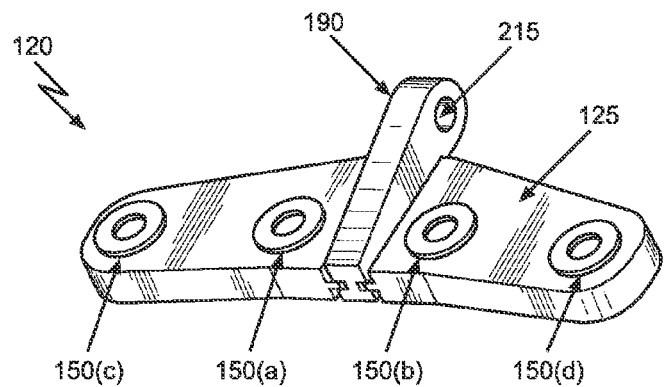
FIG. 15 illustrates a top perspective view of the lower lifting bracket in accordance with a fourth embodiment.

A fourth embodiment with respect to the lower lifting bracket 120 is illustrated in FIG. 15. The present embodiment is similar to the first embodiment of the invention described; however, the fourth embodiment includes an additional adjustable hole assembly. The lower lifting bracket 120 of the present embodiment has a total of four adjustable hole assemblies on its first portion 125. An additional adjustable hole assembly is incorporated on each side of the second portion 190 of the lower lifting bracket 120. According to the present embodiment, the lower lifting bracket 120 comprises of a first portion 125 and a second portion 190.

Figure 16:
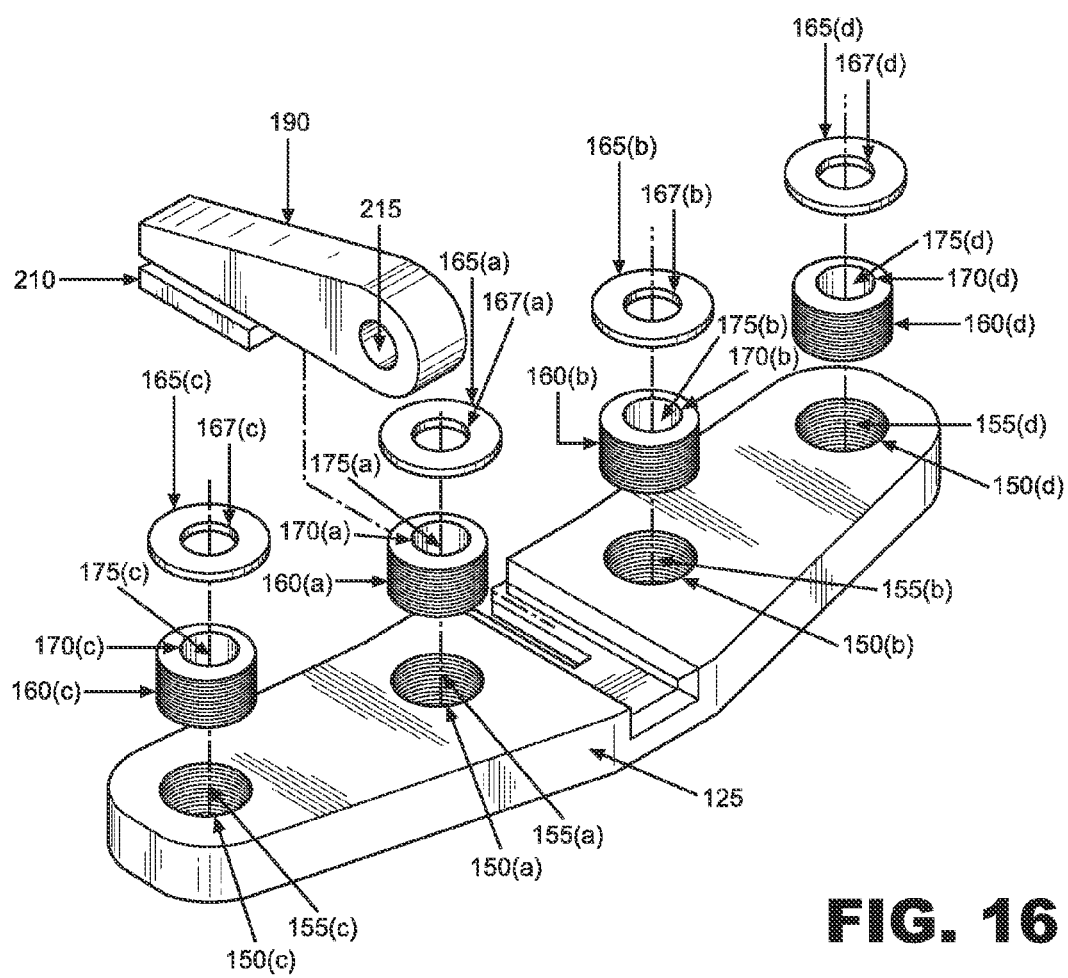
FIG. 16 illustrates an exploded view of the lower lifting bracket in accordance with the fourth embodiment.

FIG. 16 illustrates the exploded view of the lower lifting bracket 120 of the present embodiment. The first portion 125 of lower lifting bracket 120 has a first adjustable hole assembly 150(a), a second adjustable hole assembly 150(b), a third adjustable hole assembly 150(c) and a fourth adjustable hole assembly 150(d) formed therein, which are similar in design and function to the adjustable hole assemblies 150(a) and 150(b) of the first embodiment. The four adjustable hole assemblies 150(a), 150(b), 150(c) and 150(d) are spaced substantially equally apart from one another. The first adjustable hole assembly 150(a) and the third adjustable hole assembly 150(c) lie on one side of the second portion 190 whereas the second adjustable hole assembly 150(b) and the fourth adjustable hole assembly 70(d) lie on the other side of the second portion 190. The third adjustable hole assembly 150(c) has a threaded cylindrical wall forming a first through hole 155(c), which engages a threaded insert 160(c). An annular flange 165(c) with a concentric hole 167(c) is fixedly secured atop the threaded insert 160(c) and has a diameter larger than the diameter of the first through hole 155(c), such that a portion of the outer perimeter of the bottom surface of the annular flange 165(c) rests atop the bracket 120, when the threaded insert 160(c) is fully secured within the second through hole 155(c). Within the threaded insert 160 (c) is an eccentric hole 170 (that does not share a common center point with the first through hole 155(c). The diameter of the eccentric hole 170(c) is appreciably less than the diameter of the first through hole 155(c) such that the eccentric hole 170(c) bores through the length of the threaded insert 160(c), thereby forming an additional through hole 175(c). The fourth adjustable hole assembly 155(b) is similarly configured and operates in a similar manner.

As the lower lifting bracket 120 is provided with four adjustable hole assemblies on the first portion 85, a single lower lifting bracket is sufficient in order to lift the object 300 as illustrated in FIG. 17. Similar to the first embodiment of the invention, as illustrated in FIG. 18, the first upper lifting bracket 20(a) and the second upper lifting bracket 20(b) are aligned and fastened along the upper flange 240 at the upper end 135 of the object 300 at nine o' clock and three o' clock position, respectively. As illustrated in FIG. 19, only a single lower lifting bracket 120 is positioned along the lower flange 250 of the object 300 at the twelve o' clock position. The first adjustable hole assembly 150(a) of the lower lifting bracket 120 is aligned with respect to the spaced apart holes 260 along the lower flange 250 by hand turning it and hence adjusting the distance, such that a fastening bolt or the like, passing through the eccentric hole 170(a) also passes through one of the spaced apart holes 260 along the lower flange 250 of the object 300. The second adjustable hole assembly 150(b), third adjustable hole assembly 150(c), and forth adjustable hole assembly 150(d) are each configured and operate in a manner similar to first adjustable hole assembly 150(a). A nut may be used in order to secure the fastening bolts. Thus, the lower lifting bracket 120 is securely fastened along the lower flange 250 at the lower end 245 of the object 300 at the twelve o' clock position. Once the pair of the upper lifting bracket 20(a) and 20(b) and the lower lifting bracket 120 are aligned and fastened along their positions on the upper flange 240 and lower flange 260 of the object 300 respectively, a cable 270 is be used to hook the lifting device 350 to the loops 90 and 220 of the upper lifting brackets 20(a) and 20(b) and the lower lifting bracket 120, respectively. A chain, rope or any other similar means may be used to hook the lifting device 350 to the loops 90 and 220. The lifting device 350 then first raises the object 300 while it is positioned horizontally relative to ground and then lowers the lower end 245 of the object 300 such that the object 300 comes into a vertical position relative to ground.

Figure 20:
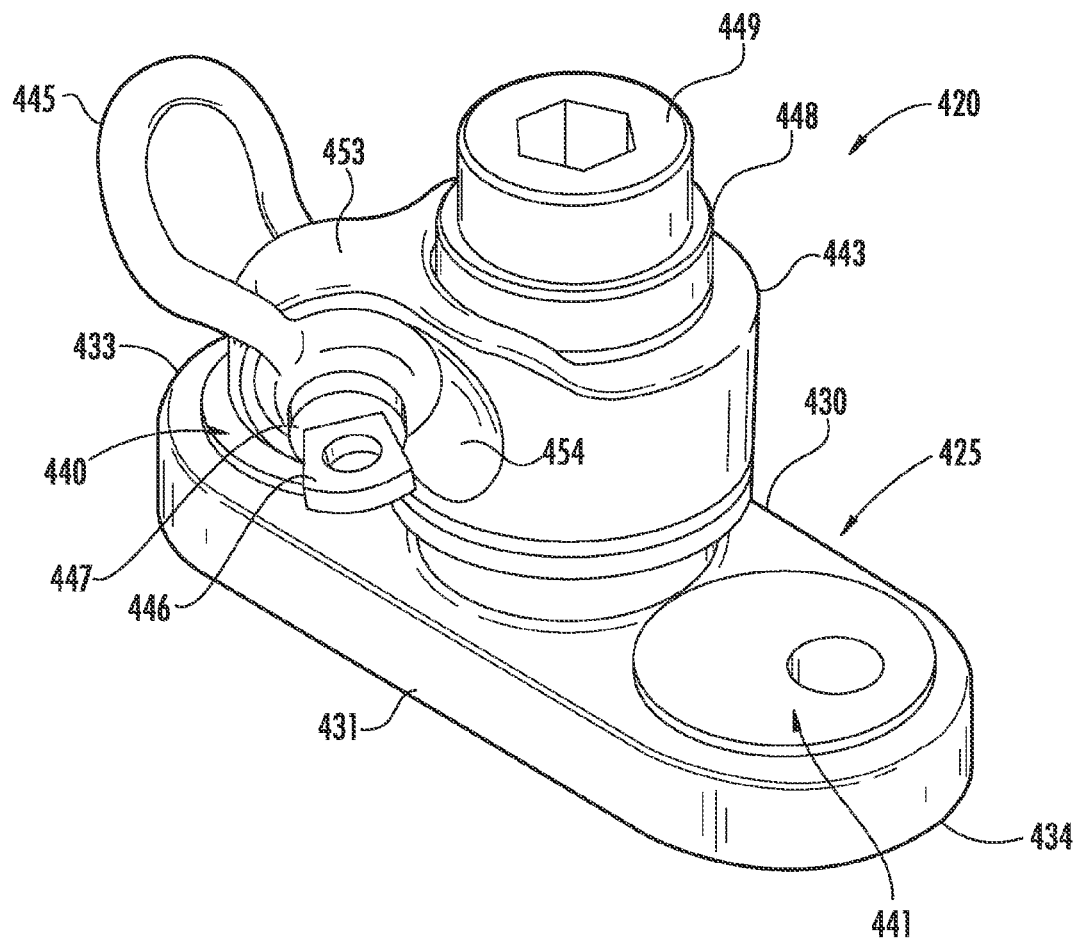
FIG. 20 illustrates a perspective view of an additional embodiment of a lifting bracket having a swivel device.

An additional embodiment of an upper lifting bracket 420 is shown in FIG. 20. Lifting bracket 420, which is used with a lifting assembly for raising an object 300 (such as a cylindrical tower) using a lifting device (not shown). Bracket 420 includes a flange attachment piece 425 that is adapted to be fasted to upper flange 240. Flange attachment piece 425 includes two elongated edges 430, 431 and two rounded ends 433, 434 such that that the distance from one elongated edge to the other elongated edge is similar to the width of flange 240. In addition, flange attachment piece 435 includes adjustable hole assemblies 440, 441 for aligning with spaced apart holes 255 of upper flange 240. Adjustable hole assemblies 440, 441 allow lifting bracket 420 to be used to lift objects having spaced-apart holes of varying distances. Lifting bracket 420 also includes a swivel device 443, hoist ring 445 and a shackle pin 446 with stop and gripping portion 447. Swivel device 443 is secured to flange attachment piece 425 and flange 240 by way of washer 448 and bolt 449. Swivel device 443 includes a hoist ring attachment loop 453 through which shackle pin 446 extends to secure hoist ring 445 to swivel device 443. An indentation 454 is formed within swivel device 443 to accommodate hoist ring 445 and to allow smooth pivoting.

Figure 21:
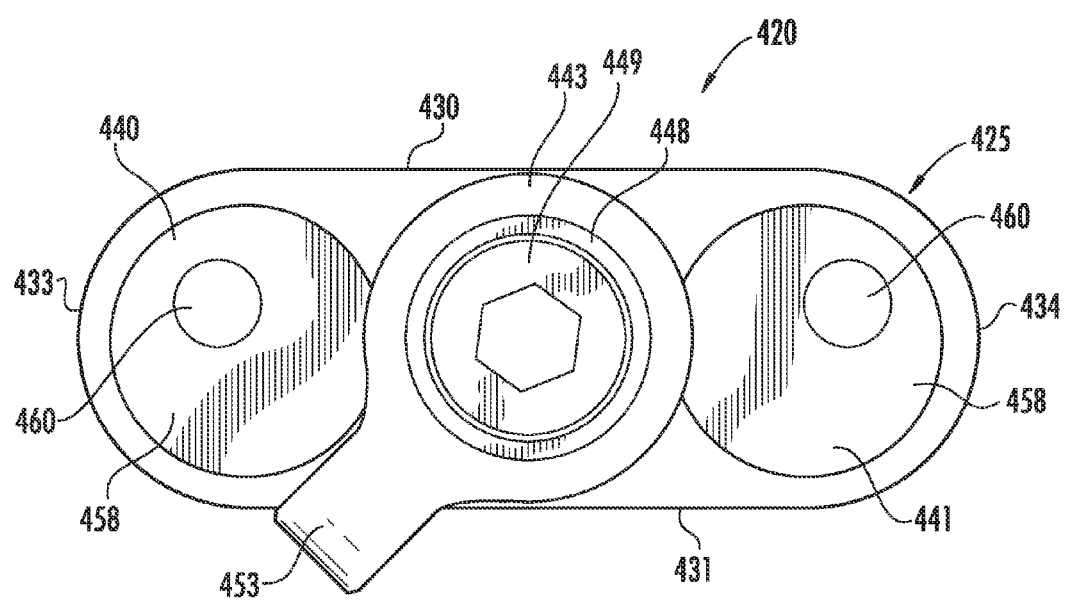
FIG. 21 illustrates a top view of the lifting bracket of FIG. 20.

FIG. 21 depicts a top view of lifting bracket 420 without hoist ring 445 attached. Flange attachment piece 435 is shown with eccentric adjustable hole assemblies 440, 441 and swivel device 443. Washer 448 and bolt 449 are also shown from a top view in FIG. 21. As shown, swivel device 443 is positioned such that hoist ring attachment loop 453 is angled towards rounded edge 433 of flange attachment piece 425.

Figure 22:
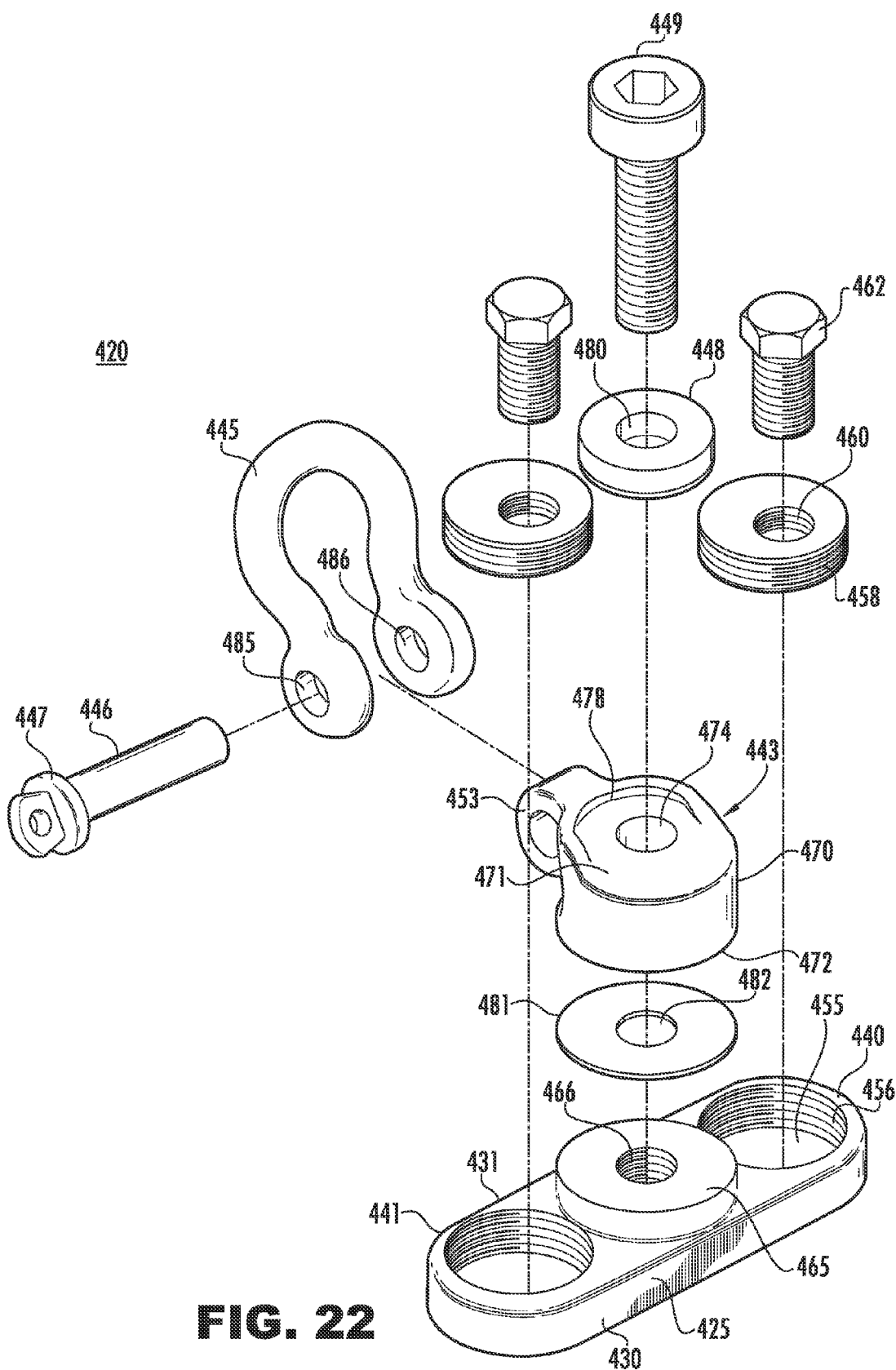
FIG. 22 illustrates an exploded view of the lifting bracket of FIG. 20.

FIG. 22 is an exploded view of lifting bracket 420. As also shown in FIGS. 20-21, flange attachment piece 425 includes a first and second adjustable hole assemblies 440 and 441. For the sake of simplicity only adjustable hole assembly 440 will be described in detail. It should be understood that hole assembly 441 includes identical parts. Adjustable hole assembly includes a through hole 455 with a threaded cylindrical wall 456, which engages a threaded insert 458. Within threaded insert 458 is an eccentric hole 460 that does not share a common center point with the first through hole 455. The diameter of the eccentric hole 460 is appreciably less than the diameter of the first through hole 455 such that the eccentric hole 460 bores through the length of the threaded insert 458, thereby forming an additional through hole such that a bolt 462 or the like can be fastened within through hole 460. Thus, eccentric holes may be adjusted such that they align with respect to the spaced apart holes 255 along the flange 240 by hand turning or similar means and hence adjusting the distance, such that fastening bolt 462 or the like, passing through eccentric hole 460, also passes through one of spaced apart holes 255 along the upper flange 240 of the object 300.

Still referring to FIG. 22, flange attachment piece 425 further includes a raised cylindrical component 465 having a threaded through hole 466 to facilitate fastening of swivel device 443. Raised cylindrical component 465 may be integrally formed with flange attachment piece 425 or may be an insert in an aperture similar to aperture 455 and eccentric insert 458. Swivel device 443 has a generally cylindrical body 470 having an upper end 471, a lower end 472 and a non-threaded through hole 474 extending therethrough. Further, hoist ring attachment loop 453 extends from cylindrical body 470 for accepting shackle pin 446 to secure hoist ring 445 to swivel device 443. An indentation 454 is provided to accommodate hoist ring 445. Upper end 471 of cylindrical body 470 also includes a partial ledge 478 that follows the perimeter of cylindrical body proximate to the end closet to hoist ring attachment loop 453. Partial ledge 478 assists in positioning washer 448 against swivel device 443. Washer 448 includes a non-threaded or threaded through hole 480 that aligns with non-threaded through hole 474 of swivel device 443. A second washer 481 having hole 482 is positioned between lower end 472 of swivel device 443 and raised cylindrical component 465 of flange attachment piece 425. Bolt 449 extends through a hole 480 of washer 448, hole 474 of swivel device 443, hole 482 of washer 481, hole 466 of raised cylindrical portion 465 of flange attachment piece 425, one hole of said plurality of spaced-apart holes 255 on flange 240. Swivel device 443 is attached such as to permit it freely rotate about bolt 449 when cylindrical object, such as a tower section, is being lifted from a horizontal position to a vertical position. Alternatively, a pin, which is secured at one end, may be used in place of bolt 449 to allow for free rotation of swivel device 443.

Lifting bracket 420 also includes hoist ring 445 having first and second through holes 485 and 486 formed at a first and second end of generally U-shaped hoist ring 445. First and second ends of hoist ring 445 are enlarged compared to the remainder of hoist ring 445 to allow for formation of first and second through holes 485 and 486. Indentation 454 in cylindrical body 470 of swivel device 443 is provided to accommodate hoist ring 445 ends having first and second through holes 485, 486, which align with hoist ring attachment loop 453 of swivel device 443 such that shackle pin 446 may extend through hole 485, loop 453, and hole 486. Shackle pin 446 is provided with a stop 447 to prevent shackle pin 446 from overextending through hole 485, loop 453, and hole 486. Shackle 445 is capable of freely pivoting through a 90 degree angle about pivot pin 446. A bolt or other fastener (not shown) may be provided on an opposite end of shackle pin 446.

Figure 23:
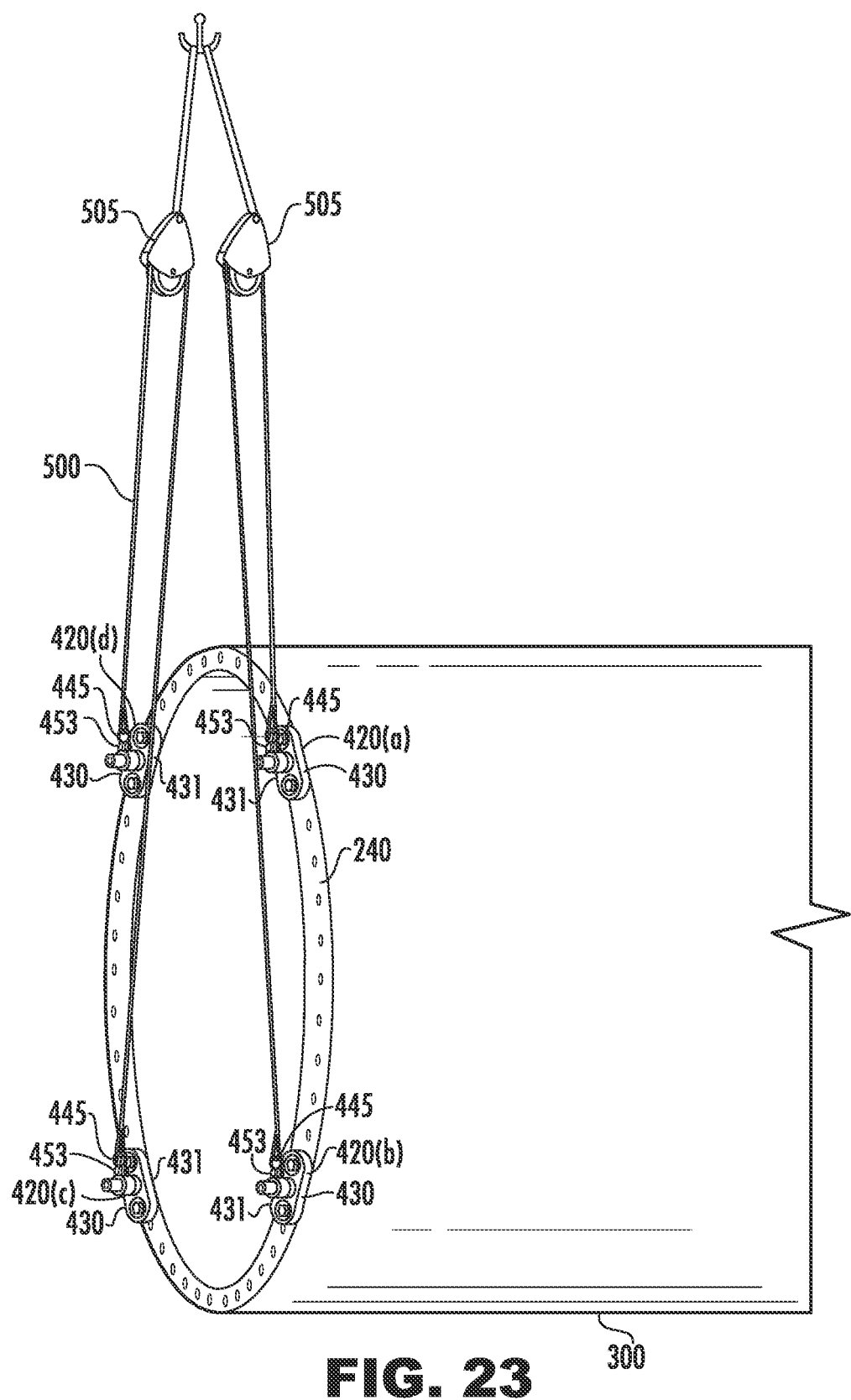
FIGS. 23-25 illustrate a plurality of the lifting brackets as shown in FIG. 20 lifting an object having a flange from a horizontal (FIG. 23) to a midway (FIG. 24) to an upright vertical position (FIG. 25).
Figure 24:
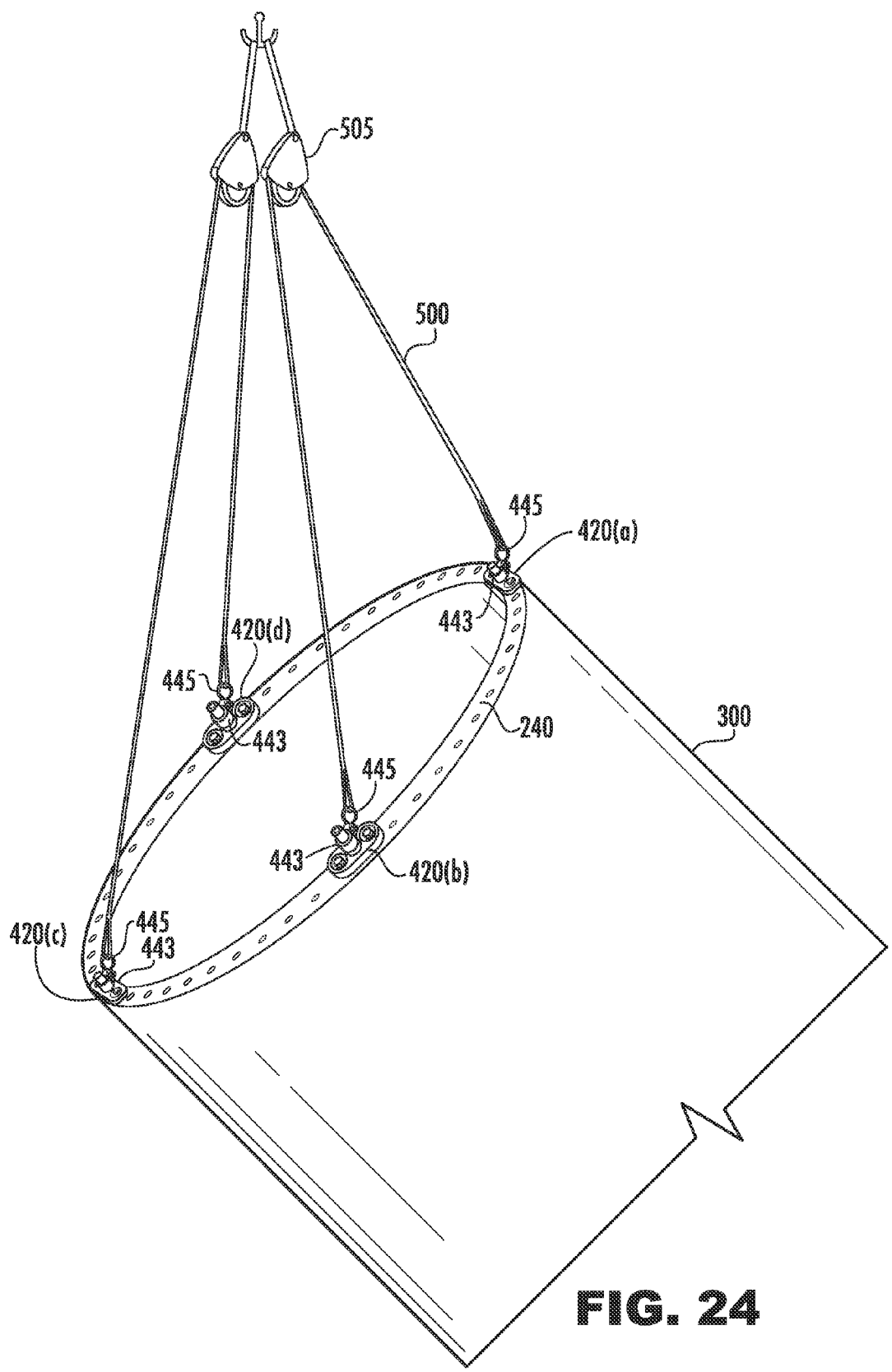
Figure 25:
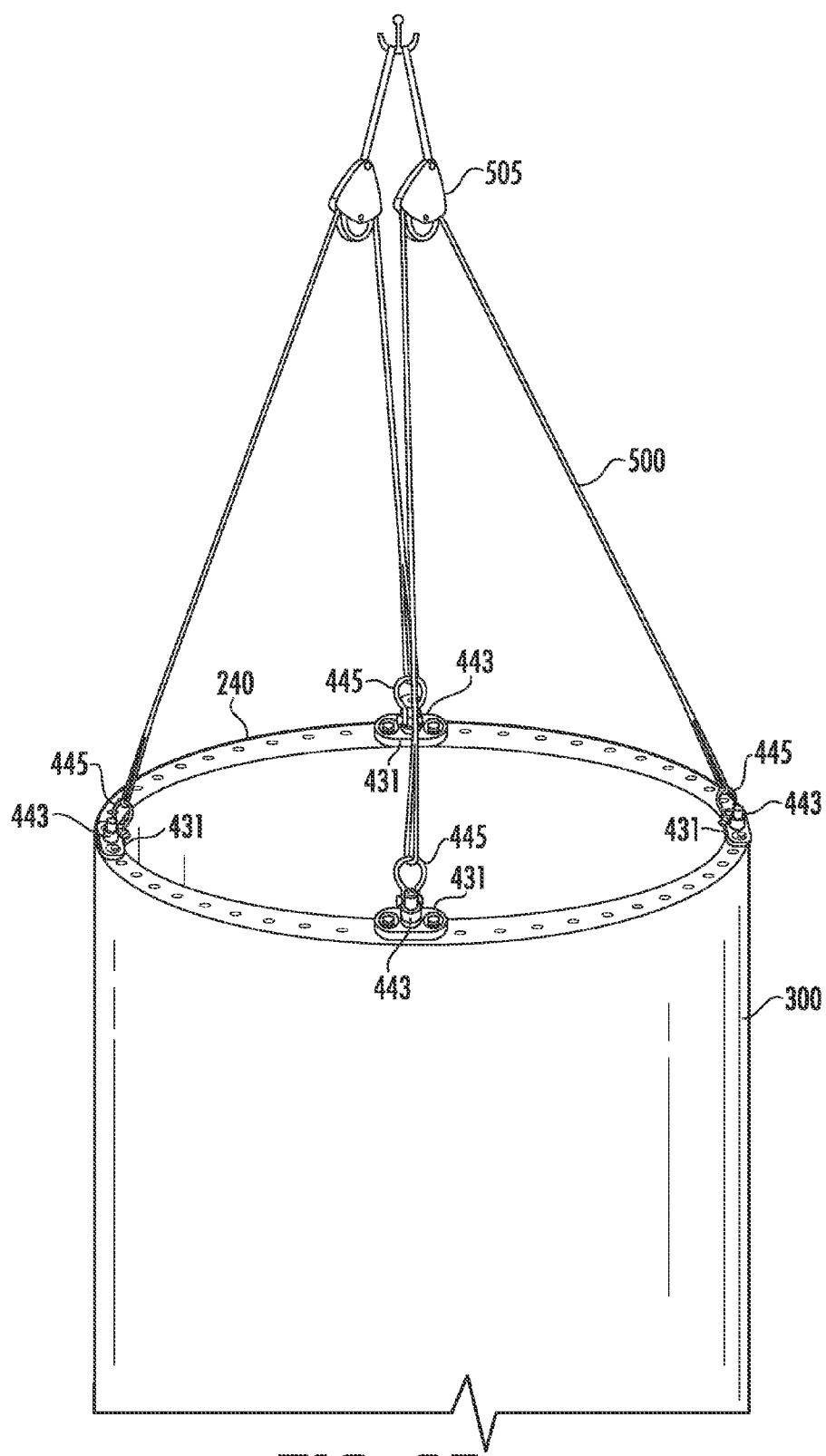

FIGS. 23-25 illustrate a plurality of the lifting brackets, indicated at 420(a), 420(b), 420(c), and 420(d), as shown in FIG. 20 lifting an object 300 having a flange 240 from a horizontal (FIG. 23) to a midway (FIG. 24) to an upright vertical position (FIG. 25). Each bracket is attached to a wire rope 500, or other suitable cord, by way of a hoist ring 445. Wire rope 500 is also threaded through one or more pulleys 505 adapted to receive the wire rope 500 passing through hoist ring 445, thereby allowing wire rope 500 to travel freely through pulleys 505 and hoist ring 445. As depicted in FIG. 23, brackets 420(a), 420(b), 420(c), and 420(d) are positioned on flange 240 at approximately 1:30, 1:30, 7:30 and 10:30 o'clock. Swivel devices 443 are rotated such that hoist ring attachment loops 453 and hoist rings 445 are positioned at an angle relative to elongated edges 431 of brackets 420(a), 420(b), 420(c), and 420(d). Hoist rings may pivot through a 90 degree angle within hoist ring attachment loops 453 and swivel devices 443 are capable of swiveling to a position that puts the least amount of stress on brackets 420(a), 420(b), 420(c), and 420(d). In FIG. 24, object 300 has been lifted to a midway position. Swivel devices 443 and hoist rings 445 of brackets 420(a), 420(b), 420(c), and 420(d) have each rotated relative to their respective positions in FIG. 23. With respect to FIG. 25, which shows tower or object 300 in a vertical position, each swivel device 443 is rotated such that each hoist ring attachment loop (not labeled) is positioned perpendicular to a respective bracket edge 431. In addition, each hoist ring 445 is pivoted towards pulleys 505. The co-acting movement of swivel device and pivoting hoist ring reduces stresses on brackets 420 and the overall assembly. It should also be understood that second end 245 of object 300 also includes brackets, such as brackets 420, fastened thereto to assist in lifting object 300. Brackets may be positioned at any suitable position, such as at approximately 11 o'clock and 1 o'clock positions of flange 250.

While specific embodiments have been described in detail, those with ordinary skill in the art will appreciate that various modifications and alternatives to those details could be developed in the light of the overall teachings of the disclosure. For example, the adjustable hole assemblies of the upper lifting bracket may be formed of any configuration for the insert hole within the annular flange, for example, eccentric, concentric, ovals or the like and any combinations thereof. Hence, it is possible to have various designs of the upper lifting brackets that are adaptable, by using different combinations of configuration for the insert hole within the annular flange of the adjustable hole assemblies. There can be variable number of adjustable hole assemblies on each of the upper lifting bracket. Additionally, any of the adjustable hole assemblies on the upper lifting bracket may be replaced by a simple guide pin hole. Similar modifications may also be applied to the lower lifting bracket. Furthermore, it is to be understood that the lifting assembly may comprise any combination of number of upper lifting brackets and number of lower lifting brackets, each employing similar or variable combinations of adjustable hole assembly configurations to lift the object, depending on the requirement of the object. The examples used to illustrate the embodiments of the present invention, in no way limit the applicability of the present invention to them.

I claim:

1. A lifting assembly for lifting an object using a lifting device, said object having upper and lower ends each with an annular flange having spaced-apart holes therein, the lifting assembly comprising:
    a plurality of lifting brackets, each including a flange attachment piece having a top surface and a bottom surface and at least-two spaced-apart through holes, each of said through holes defined by cylindrical side walls, at least one of the spaced-apart through holes being an adjustable hole assembly having a cylindrical insert positioned entirely therein such that said cylindrical insert extends from the top surface to the bottom surface of the flange attachment piece, for aligning with at least one hole of said plurality of corresponding spaced-apart holes on the flange of the upper end of the object, said adjustable hole assembly being adjustable such that plurality lifting brackets may be used to lift objects having spaced-apart holes of varying distances;

a plurality of hoist rings for receiving a wire rope, each of said hoist rings including a first and second ends having through holes formed therein;

a plurality of swivel devices each having a body with a hoist ring connection loop and a through hole, each of said plurality of swivel devices having a first pin contained within said hoist ring connection loop for securing said hoist ring to each of said swivel devices and a second pin contained within said second through hole for securing one of said lifting brackets to said object flange by extending through one of said spaced-apart holes of said flange, wherein said first pin is contained within said hoist ring connection loop so as to permit said swivel device to freely rotate about said second pin when a tower section is being lifted from a horizontal position to a vertical position; and a plurality of pulleys adapted to receive the wire rope passing through said hoist ring, thereby allowing the wire rope to travel freely through said pulleys and said hoist ring.

2. The lifting assembly of claim 1, wherein the least one adjustable hole assembly of the first and second upper lifting brackets includes a threaded cylindrical wall containing a threaded insert with an eccentric hole formed therein.

3. The lifting assembly of claim 1, wherein the least one adjustable hole assembly of the at least one lower lifting bracket includes a threaded cylindrical wall containing a threaded insert with an eccentric hole formed therein.

4. The lifting assembly of claim 1, wherein the at least one adjustable hole assembly of the first and second upper lifting brackets includes a threaded cylindrical wall containing a threaded insert with a concentric hole formed therein.

5. The lifting assembly of claim 1, wherein said swivel device body includes an indentation adjacent to said hoist ring connection loop to accommodate said hoist ring ends.

6. An lifting bracket for use with a lifting assembly for raising an object using a lifting device, said object having upper and lower ends each with a flange having a plurality of spaced-apart holes therein, said bracket comprising:

a flange attachment piece having a top surface and a bottom surface and at least-two spaced-apart through holes, said through holes defined by cylindrical side walls, at least one of the spaced-apart through holes being an adjustable hole assembly having a cylindrical insert positioned entirely therein such that said cylindrical insert extends from the top surface to the bottom surface of the flange attachment piece, for aligning with at least one hole of said plurality of spaced-apart holes on the flange of the upper end of the object, said least one adjustable hole assembly being adjustable such that the lifting bracket may be used to lift objects having spaced-apart holes of varying distances;

a hoist ring for receiving a wire rope, said hoist ring including first and second ends having through holes formed therein; and a swivel device having a body with a hoist ring connection loop and a through hole, said swivel device having a first pin contained within said hoist ring connection loop for securing said hoist ring to said swivel device and a second pin contained within said through hole for securing said lifting bracket to said object flange by extending through one of said spaced-apart holes of said flange, wherein said first pin is contained within said hoist ring connection loop so as to permit said swivel device to freely rotate about said second pin when a tower section is being lifted from a horizontal position to a vertical position.

7. The lifting bracket of claim 6, wherein the least one adjustable hole assembly includes a threaded cylindrical wall containing a threaded insert with an eccentric hole formed therein.

8. The lifting bracket of claim 6, wherein the least one adjustable hole assembly includes a threaded cylindrical wall containing a threaded insert with a concentric hole formed therein.

9. The lifting bracket of claim 6, wherein said swivel device body includes an indentation adjacent to said hoist ring connection loop to accommodate said hoist ring ends.

\* \* \* \* \*